April 12, 1949.   G. W. WHITE   2,467,065
MIXING FAUCET
Filed July 20, 1946
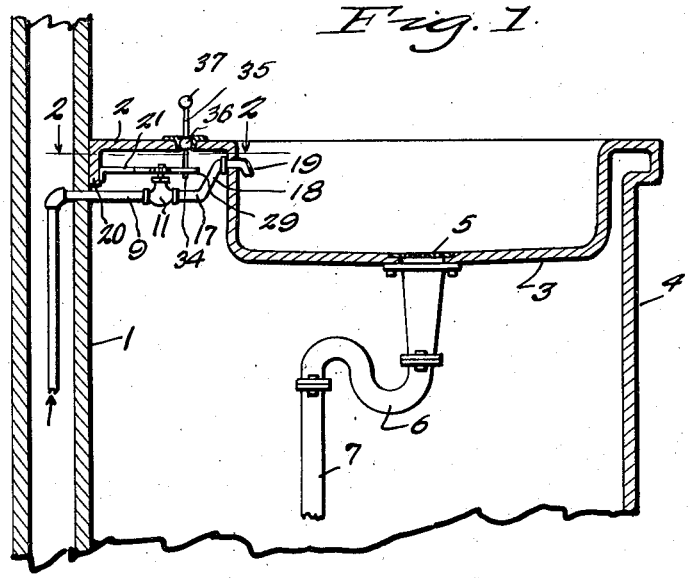
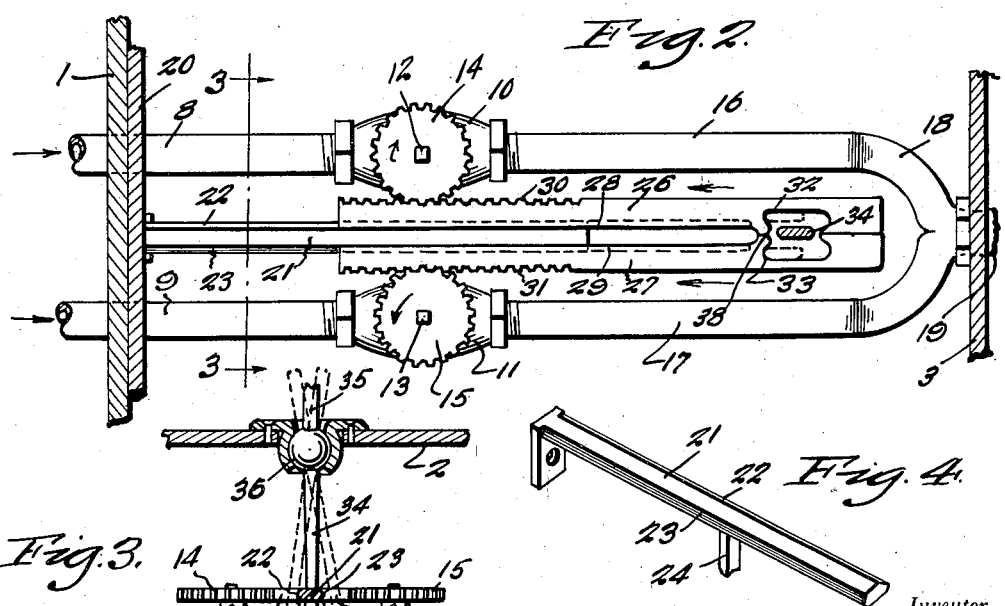
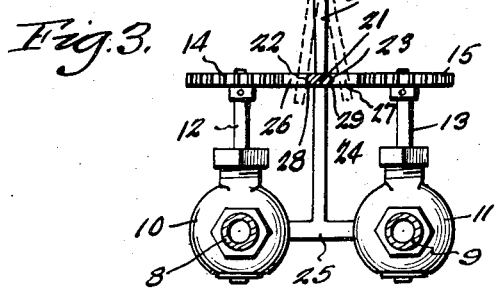
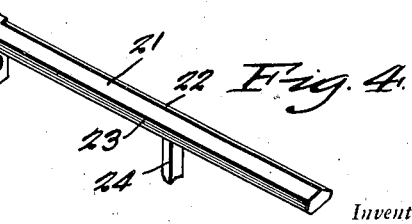
Inventor
GEORGE W. WHITE
By Clarence A. O'Brien
and Harvey B. Jacobson
Attorneys Patented Apr. 12, 1949

2,467,065

UNITED STATES PATENT OFFICE 2,467,065

MIXING FAUCET

George W. White, Kenosha, Wis.

Application July 20, 1946, Serial No. 685,260

1 Claim. (Cl. 4—192)

This invention relates to improvements in mixing faucets and operating means therefor.

An object of the invention is to provide an improved construction of a single operating lever for a pair of mixing faucets for hot and cold water.

Another object of the invention is to provide a ball and socket mounted lever for operating a pair of faucets for controlling the same simultaneously or for individually controlling the operation thereof.

A further object of the invention is to provide a ball and socket mounted operating lever and rack and gear mechanism associated therewith for operating hot and cold water faucets to selectively operate either faucet separately, or to jointly operate the faucets to control the amount of flow and temperature of the water as it is discharged from the faucets.

Another object of the invention is to provide an improved mixing faucet arrangement and operating mechanism therefor which will include gears on the faucet valve stems and slidable racks meshed therewith, together with a single universally mounted operating lever for engaging either or both racks to control the amount of water being discharged through the faucets, and to control the temperature thereof.

Another object of the invention is to provide an improved mixing faucet construction which will be highly efficient in operation, and relatively inexpensive to manufacture and produce.

Other objects will appear as the description proceeds.

In the accompanying drawings which form a part of this application,

Figure 1 is a transverse sectional view through a wall and an attached sink with the improved mixing faucets and operating means therefor incorporated therewith;

Figure 2 is a plan view partly in section taken on the line 2—2 of Figure 1;

Figure 3 is a sectional view taken on the line 3—3 of Figure 2, and

Figure 4 is a perspective view of the rack guide bar.

Like characters of reference are used throughout the following specification and the accompanying drawings to designate corresponding parts.

In carrying out the invention, a double wall structure 1 is shown, to which the rear apron 2 of the sink 3 is attached in any desired manner. The sink 3 is formed with an integral front apron 4, and with the drain outlet 5 which is connected with the trap 6, and drain pipe 7, in the usual manner.

The hot and cold water supply pipes 8 and 9 will extend from the source of water supply (not shown) and will be connected with the hot and cold water faucets 10 and 11, respectively.

Suitable valves (not shown) will be disposed in the faucets 10 and 11 and will be provided with the valve stems 12 and 13, on which the gears 14 and 15 are respectively secured.

The outlet pipes 16 and 17 from the faucets 10 and 11 will be joined at 18 to provide a single water outlet or nozzle 19 which will extend through the rear wall of the sink 3, with the faucets and their operating means later to be described disposed below the rear apron 2, as clearly illustrated in Figure 1 of the drawings.

Supported on the depending flange 20 on the rear apron 2 of the sink 3, is a horizontally and forwardly extending double rack guide member 21 which is formed along its opposite edges with the V-shaped tracks 22 and 23, and a depending strut 24, which supports the transversely extending duct 25, which is secured in any desired manner to the oppositely disposed faucets 10 and 11, to support the rack guide member 21 in steady and fixed position.

The parallel extending valve operating rack bars 26 and 27 are provided with the V-shaped bearing surfaces or grooves 28 and 29 along their inner edges to seat on the V-shaped tracks 22 and 23 on the rack guide member 21, and are formed with the toothed racks 30 and 31 on their outer edges for engagement with valve operating gears 14 and 15.

The outer ends of the rack bars 26 and 27 are slotted as at 32 and 33 respectively to form seats for selective engagement by the depending end 34 of the single operating lever 35, which is supported in the ball and socket support 36 secured to the rear apron 2 of the sink 3, and formed with a handle or knob 37 on its upper end. A seat 38 will be formed by the adjacent center portions of the seat 32 and 33, whereby the same may be engaged by the end 34 of the operating lever 35 for simultaneously operating and controlling both faucets 10 and 11 at the same time. Obviously, when the end 34 is moved to engage the seat 32 and the lever 35 forwardly or backwardly, the hot water faucet 10 only will be operated, and conversely, when the end 34 is moved into the seat 35 and the lever 36 is moved forwardly or backwardly, the cold water faucet 11 only will be operated.

From the foregoing description, it will be apparent that there has been provided a highly efficient form of mixing valve construction and operating mechanism therefor whereby either one or both faucets may be operated individually or together, to effectively and efficiently control the amount of water being discharged from the faucets and for controlling the temperature of said water.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

In combination with a pair of faucet valves, gears connected with said valves, a rack guide formed with oppositely disposed bearing edges, oppositely disposed racks formed with bearing grooves in their adjacent edges cooperating with said bearing edges on said rack guide, bearing seats formed in the outer ends of each rack, a bearing seat formed intermediate said first mentioned seats, and a single operating lever selectively engageable with said seats for operating said racks either simultaneously or individually for controlling said faucet valves.

GEORGE W. WHITE.

REFERENCES CITED

The following references are of record in the file of this patent:

UNITED STATES PATENTS

| Number | Name | Date |
|---|---|---|
| 867,580 | Hooper | Oct. 8, 1907 |
| 1,176,784 | Speiden | Mar. 28, 1916 |
| 1,500,694 | Whidden | July 8, 1924 |
| 1,641,560 | Whidden | Sept. 6, 1927 |